United States Patent
Xie et al.

(10) Patent No.: US 8,717,049 B2
(45) Date of Patent: May 6, 2014

(54) SYSTEM AND METHOD FOR TESTING COMPUTER UNDER VARYING ENVIRONMENTAL CONDITIONS

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/193,623

(22) Filed: Jul. 29, 2011

(65) Prior Publication Data
US 2012/0169364 A1   Jul. 5, 2012

(30) Foreign Application Priority Data
Dec. 30, 2010   (CN) .......................... 2010 1 0614589

(51) Int. Cl.
*G01R 31/10* (2006.01)
*G01K 7/00* (2006.01)

(52) U.S. Cl.
USPC ............ 324/750.14; 324/750.26; 324/750.28

(58) Field of Classification Search
None
See application file for complete search history.

(56) References Cited

U.S. PATENT DOCUMENTS

| | | | | |
|---|---|---|---|---|
| 6,023,985 | A * | 2/2000 | Fournier | 73/865.6 |
| 6,227,701 | B1 * | 5/2001 | Wu | 374/57 |
| 6,830,372 | B2 * | 12/2004 | Liu et al. | 374/57 |
| 2008/0088301 | A1 * | 4/2008 | Tan et al. | 324/158.1 |
| 2011/0040423 | A1 * | 2/2011 | Chen | 700/299 |
| 2012/0047399 | A1 * | 2/2012 | Xie et al. | 714/25 |

* cited by examiner

*Primary Examiner* — Vinh Nguyen
(74) *Attorney, Agent, or Firm* — Novak Druce Connolly Bove + Quigg LLP

(57) ABSTRACT

A system for testing a computer includes a single chip microcontroller (SCM), an environmental test chamber, and a control device connected to the SCM and the environmental test chamber. The SCM repeatedly switches the computer on and off and monitors the computer's response. The environmental test chamber accommodates the computer. The control device receives monitored data from the SCM and controls temperature and humidity in the environmental test chamber.

1 Claim, 4 Drawing Sheets

SYSTEM AND METHOD FOR TESTING COMPUTER UNDER VARYING ENVIRONMENTAL CONDITIONS

BACKGROUND

1. Technical Field

The present disclosure relates to a system and method for testing a computer under varying environmental conditions.

2. Description of Related Art

After a computer is produced, quality tests are required. One of the tests is for testing stability of the computer when the computer is turned on or turned off. In testing, the computer is powered on and off repeatedly.

A test device for testing stability of a computer includes a single chip microcontroller (SCM) connected to the computer. The SCM sends control signals to repeatedly switch the computer on and off and detects whether the computer powers on and off according to the control signals. However, the test device cannot test the computer under various environmental conditions, which means problems may go undetected.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may also comprise programmable units, such as programmable gate arrays or processors. The modules described herein may be implemented as either software and/or hardware modules and may be stored in any type of computer-readable medium or other computer storage device.

Figure 1:
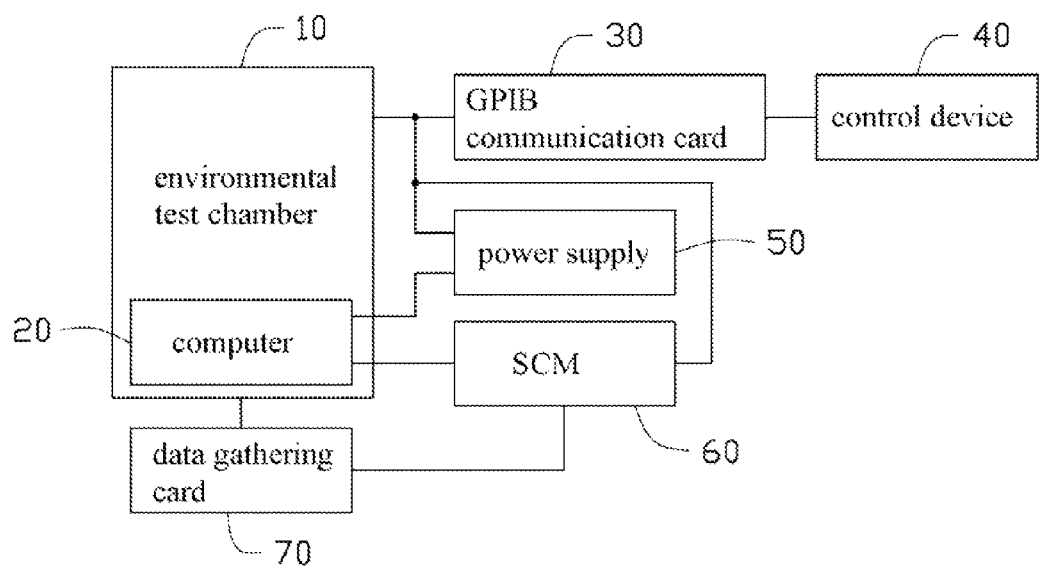
FIG. 1 is an exemplary embodiment of a block diagram of a computer testing system.

Referring to FIG. 1, an embodiment of a testing system includes an environmental test chamber 10, a general purpose interface bus (GPIB) communication card 30, a control device 40, a power supply 50, a single chip microcontroller (SCM) 60, and a data gathering card 70. A computer 20 is placed in the environmental test chamber 10. The computer 20 is connected to the power supply 50 and the SCM 60. The SCM 60 sends control signals to switch the computer 20 on and off and detects whether the computer 20 responds and powers on and off according to the control signals. The control device 40 is connected to the GPIB communication card 30. The GPIB communication card 30 is connected to the environmental test chamber 10, the power supply 50, and the SCM 60 via the GPIB communication card 30. The GPIB communication card 30 transmits instructions sent from the control device 40 to the environmental test chamber 10, the power supply 50, and the SCM 60.

Figure 2:
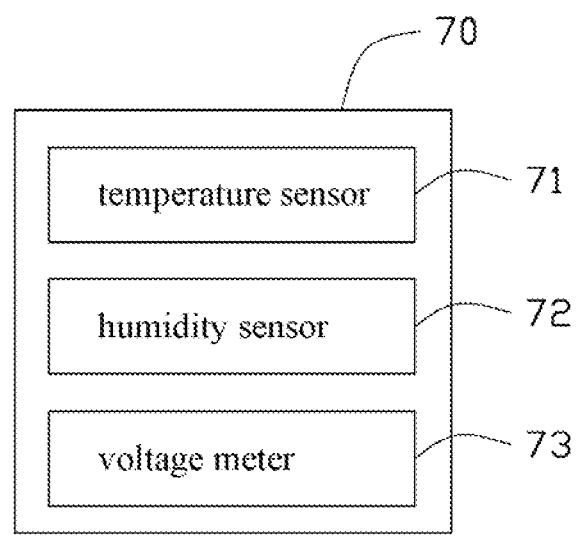
FIG. 2 is a detailed block diagram of a data gathering card of FIG. 1.

Referring to FIG. 2, a temperature sensor 71, a humidity sensor 72, and a voltage meter 73 are mounted on the data gathering card 70. The temperature sensor 71 senses temperature in the environmental test chamber 10. The humidity sensor 72 senses humidity in the environmental test chamber 10. The voltage meter 73 measures voltages at predetermined test points of the computer 20. The data gathering card 70 is connected to the SCM 60 and sends the measured data to the SCM 60.

Figure 3:
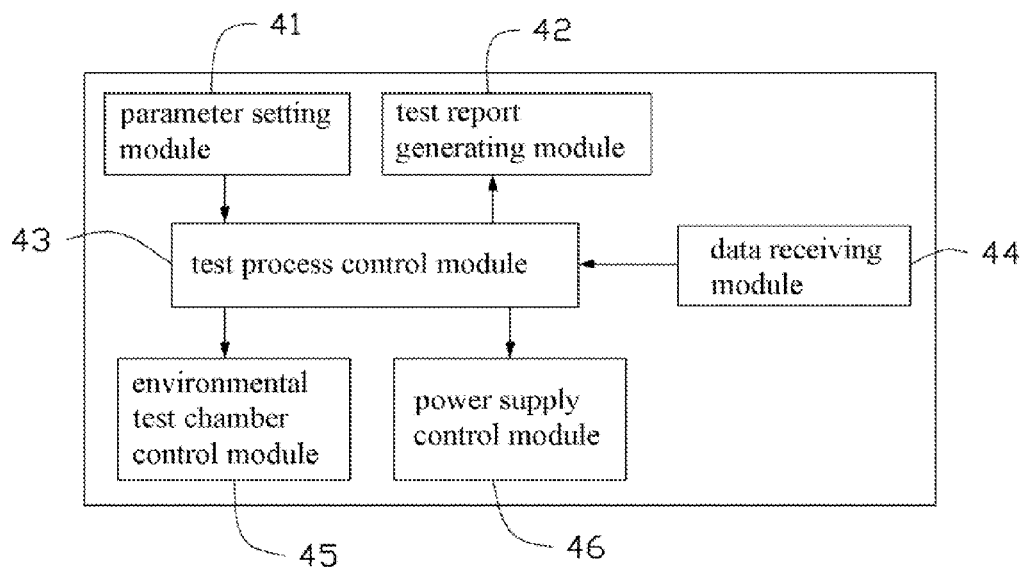
FIG. 3 is a detailed block diagram of a control device of FIG. 1.

Referring to FIG. 3, the control device 40 includes a parameter setting module 41, a test report generating module 42, a test process control module 43, a data receiving module 44, an environmental test chamber control module 45, and a power supply control module 46. The parameter setting module 41 is used to set test parameters including: total test time, sequence of instructions, etc. The test process control module 43 is connected to the parameter setting module 41 and controls test process according to the preset parameters. The data receiving module 44 receives data from the GPIB communication card 30 and sends data to the test process control module 43. The environmental test chamber control module 45 is connected to the test process control module 43, and controls the temperature and humidity in the environmental test chamber 10 according to instructions sent from the test process control module 43. The power supply control module 46 is connected to the test process control module 43 and controls on/off state of the power supply 55 according to instructions sent from the test process control module 43. The test report generating module 42 is connected to the test process control module 43. The test process control module 43 controls the test report generating module 42 to generate test reports after the test process control module 43 receives data from the data receiving module 44. The test reports include on/off frequency of the computer 20, voltages at the test points, temperature and humidity conditions, etc.

Figure 4:
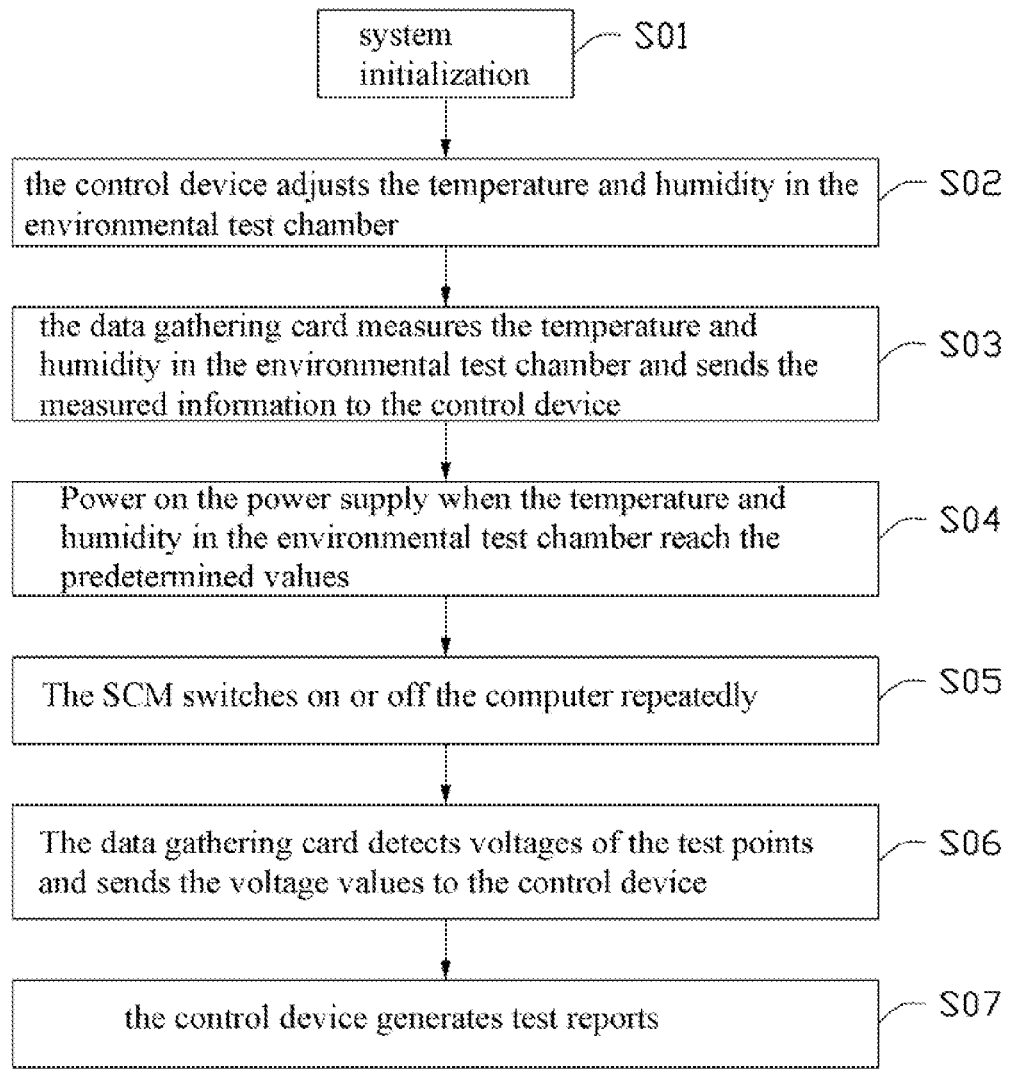
FIG. 4 is an exemplary embodiment of a flow chart of a computer testing method.

Referring to FIG. 4, an embodiment of a computer testing method based upon the computer testing system includes the following blocks.

In block S01, the system is initialized.

In block S02, the control device 40 sends instructions to adjust the temperature and humidity in the environmental test chamber 10 according to the preset parameters. In this block, the test process control module 43 sends instructions to the environmental test chamber control module 45 according to the parameters set by the parameter setting module 41. The environmental test chamber control module 45 controls the temperature and humidity in the environmental test chamber 10 according to the instructions sent from the test process control module 43.

In block S03, the temperature sensor 71 and the humidity sensor 72 sense the temperature and the humidity in the environmental test chamber 10 and sends the sensed temperature and humidity to the SCM 60. The SCM 60 sends the sensed temperature and humidity to the GPIB communication card 30. The GPIB communication card 30 sends the sensed temperature and humidity to the control device 40.

In block S04, the control device 40 sends an instruction to switch on the power supply 50 when the temperature and humidity in the environmental test chamber 10 reach predetermined values. In this block, the test process control module 43 sends the instruction to the power supply control module 46. The power supply control module 46 controls the power supply 50 to be switched on according to the instruction.

In block 505, the SCM 60 repeatedly switches the computer 20 on and off according to the predetermined frequency.

In block S06, the voltage meter 73 detects the voltages at the test points of the computer 20 and sends the voltage values to the data receiving module 44.

The data receiving module 44 sends the data sent from the data gathering card 70 and the SCM 60 to the test process control module 43. The test process control module 43 controls the test report generating module 42 to generate test reports.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A system for testing a computer comprising:
 a single chip microcontroller (SCM) for repeatedly switching on or off the computer;
 an environmental test chamber for accommodating the computer;
 a control device, connected to the SCM and the environmental test chamber, adapted to receive monitored data from the SCM and controls temperature and humidity in the environmental test chamber; and
 a data gathering card, connected to the environmental test chamber and the SCM, adapted to sense the temperature and humidity in the environmental test chamber and measure voltage signals of the computer;
 wherein the data gathering card comprises a temperature sensor to sense the temperature, a humidity sensor to sense the humidity, and a voltage meter to measure the voltage signals of the computer.

* * * * *